(12) United States Patent
Vaez-Iravani et al.

(10) Patent No.: US 11,442,000 B2
(45) Date of Patent: Sep. 13, 2022

(54) IN-SITU, REAL-TIME DETECTION OF PARTICULATE DEFECTS IN A FLUID

(71) Applicant: Applied Materials, Inc., Santa Clara, CA (US)

(72) Inventors: Mehdi Vaez-Iravani, Los Gatos, CA (US); Sankesha Bhoyar, Singapore (SG); Rachit Sharma, Bangalore (IN); Guoheng Zhao, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/716,218

(22) Filed: Dec. 16, 2019

(65) Prior Publication Data

US 2021/0181084 A1    Jun. 17, 2021

(51) Int. Cl.
*G01N 15/14* (2006.01)

(52) U.S. Cl.
CPC ..... *G01N 15/1434* (2013.01); *G01N 15/1459* (2013.01)

(58) Field of Classification Search
CPC .......... G01N 15/1434; G01N 15/1459; G01N 2015/0046
See application file for complete search history.

(56) References Cited

U.S. PATENT DOCUMENTS

| | | | |
|---|---|---|---|
| 6,256,096 B1* | 7/2001 | Johnson | G01N 15/14 356/335 |
| 6,686,946 B2 | 2/2004 | Masuda et al. | |
| 8,480,579 B2 | 7/2013 | Serov et al. | |
| 10,012,580 B2 | 7/2018 | Tatarkiewicz et al. | |
| 10,081,036 B2 | 9/2018 | Bhoyar et al. | |
| 10,422,984 B2 | 9/2019 | Banna et al. | |
| 2004/0021868 A1* | 2/2004 | Ortyn | G02B 7/28 356/419 |
| 2006/0001874 A1* | 1/2006 | Matsuda | G01N 15/1459 356/338 |
| 2006/0066846 A1 | 3/2006 | Chen et al. | |
| 2007/0229823 A1 | 10/2007 | Sung et al. | |
| 2009/0219530 A1* | 9/2009 | Mitchell | G01N 15/1463 356/336 |

(Continued)

FOREIGN PATENT DOCUMENTS

| | | |
|---|---|---|
| JP | 3521381 B2 | 4/2004 |
| TW | 201903381 A | 1/2019 |

OTHER PUBLICATIONS

Internationl Search Report and Written Opinion for PCT/US2020/054343 dated Jan. 25, 2021.

(Continued)

*Primary Examiner* — Michael A Lyons
*Assistant Examiner* — Amanda Merlino
(74) *Attorney, Agent, or Firm* — Patterson + Sheridan, LLP (57) ABSTRACT

Examples disclosed herein generally relate to an apparatus and method for detecting particles in a fluid. A system for imaging a particle includes an imaging device. The imaging device has a lens and a detector. A laser source is configured to emit a laser beam. The detector is configured to accumulate an intensity of an accumulated light that passes through the lens. The accumulated light is scattered by the particle. The particle passes through the laser beam over a given period.

20 Claims, 7 Drawing Sheets

(56) References Cited

U.S. PATENT DOCUMENTS

2018/0128733 A1  5/2018  Goradia et al.
2019/0072497 A1  3/2019  Egan et al.

OTHER PUBLICATIONS

Taiwan Office Action for Application No. 109144220 dated Oct. 5, 2021.
Stokowski, Stan, et al., "Wafer Inspection Technology Challenges for ULSI Manufacturing", AIP Conference Proceedings 449, 405 (1998), Published online Mar. 27, 2008 (https://doi.org/10.1063/1.56824).

* cited by examiner

IN-SITU, REAL-TIME DETECTION OF PARTICULATE DEFECTS IN A FLUID

BACKGROUND

Field of Endeavor

Examples disclosed herein generally relate to an apparatus and method for detecting particles in a fluid.

DETAILED DESCRIPTION

Description of the Related Art

Purified water is often used in numerous applications during semiconductor manufacturing. For example, purified water is frequently used for cleaning substrates and other semiconductor parts in a manufacturing facility. The purified water may contain particulate contamination. Known techniques for measuring samples of the purified water to determine a contamination level, require taking the samples off-site for testing, adding to the cost of testing and maintaining purified water within process requirements.

Commercially available techniques include liquid particle counters (LPC's) used to test the concentration of unwanted particles and other contaminants in the purified water. Mass spectrometry is another approach of testing purified water for unwanted particles. In mass spectrometry, a sample contained in a test tube, is aspirated by a nebulizer that shatters the purified water into droplets. A charged ion is projected through a mass spectrometer, and the ion is measured by a detector. Conductivity of the purified water can be measured in order to determine ion concentration, where the ion concentration corresponds to the level of purity in the purified water. Because these known techniques involve off-site testing, operators are faced with increased time and cost for testing the purified water to ensure it is within process requirements. While in-line and on-line spectrometers are also known, these spectrometers are only capable of detecting particle contamination at very high concentrations, and therefore not useful for contamination in purified water at low concentrations.

Accordingly, there is a need in the art for an improved method and apparatus for in-situ monitoring for contaminants in purified water.

SUMMARY

Examples disclosed herein generally relate to an apparatus and method for detecting particles in a fluid. A system for imaging a particle includes an imaging device. The imaging device has a lens and a detector. A laser source is configured to emit a laser beam. The detector is configured to accumulate an intensity of an accumulated light that passes through the lens. The accumulated light is scattered from the particle. The particle passes through the laser beam over a given period.

In another example, a light intensity measuring system includes an imaging device. The imaging device has at least one lens and an array detector. The array detector has n rows and m columns. A laser source is configured to emit a laser beam. The detector is configured to accumulate an intensity of an accumulated light that passes through the lens. The accumulated light is scattered from the particle. The particle passes through the laser beam over a given period. A vessel is proximate the laser source. The laser beam is configured to pass through the vessel.

A method of measuring light intensity is herein disclosed. The method includes flowing a fluid through a hollow vessel. The fluid has at least one particle. A laser beam is emitted through the hollow vessel onto the at least one particle. An intensity of light scattered from the particle is accumulated over a given period.

BRIEF DESCRIPTION OF THE DRAWING

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Disclosed herein is an apparatus and method for detecting particles in a fluid. Herein, a laser beam is focused into a vessel, the vessel disposed in a pool of flowing ultra-pure water (UPW). The presence of any foreign particles in the pool of UPW causes scattering of light from the laser beam. The scattered light is collected by an imaging device proximate a side of a vessel. The scattered light is focused onto a detector.

Analytical testing of the UPW's purity, according to embodiments disclosed herein, enables operators to determine water quality in real-time, on-site, where the UPW is being used. For example, testing of the UPW can occur in the semiconductor manufacturing facility, and does not require samples of the UPW to be obtained and sent to a laboratory for testing. Obtaining samples of the UPW using known conventional techniques can increase the overall cost of obtaining data, since the cost of testing includes maintaining a laboratory or shipping the samples to a laboratory and back to the semiconductor facility for further analysis. Furthermore, the length of time between sampling and obtaining data on the UPW, delays operator decision-making. Accordingly, decisions related to routine maintenance, cleaning, and filtering are delayed. A delay in decision-making can enable the overall quantity of contaminants in the UPW to go unmonitored and unfiltered, thus decreasing the cleaning effectiveness of the UPW.

Advantageously, the methods and apparatuses disclosed herein enable water quality to be monitored in real-time, thus reducing above-noted drawbacks from reliance upon periodic testing and off-site analysis. In addition, the cleaning effectiveness of the UPW is maintained to a desired level, since operators are able to detect the number of particles having particle diameters less than 20 nm.

Figure 1:
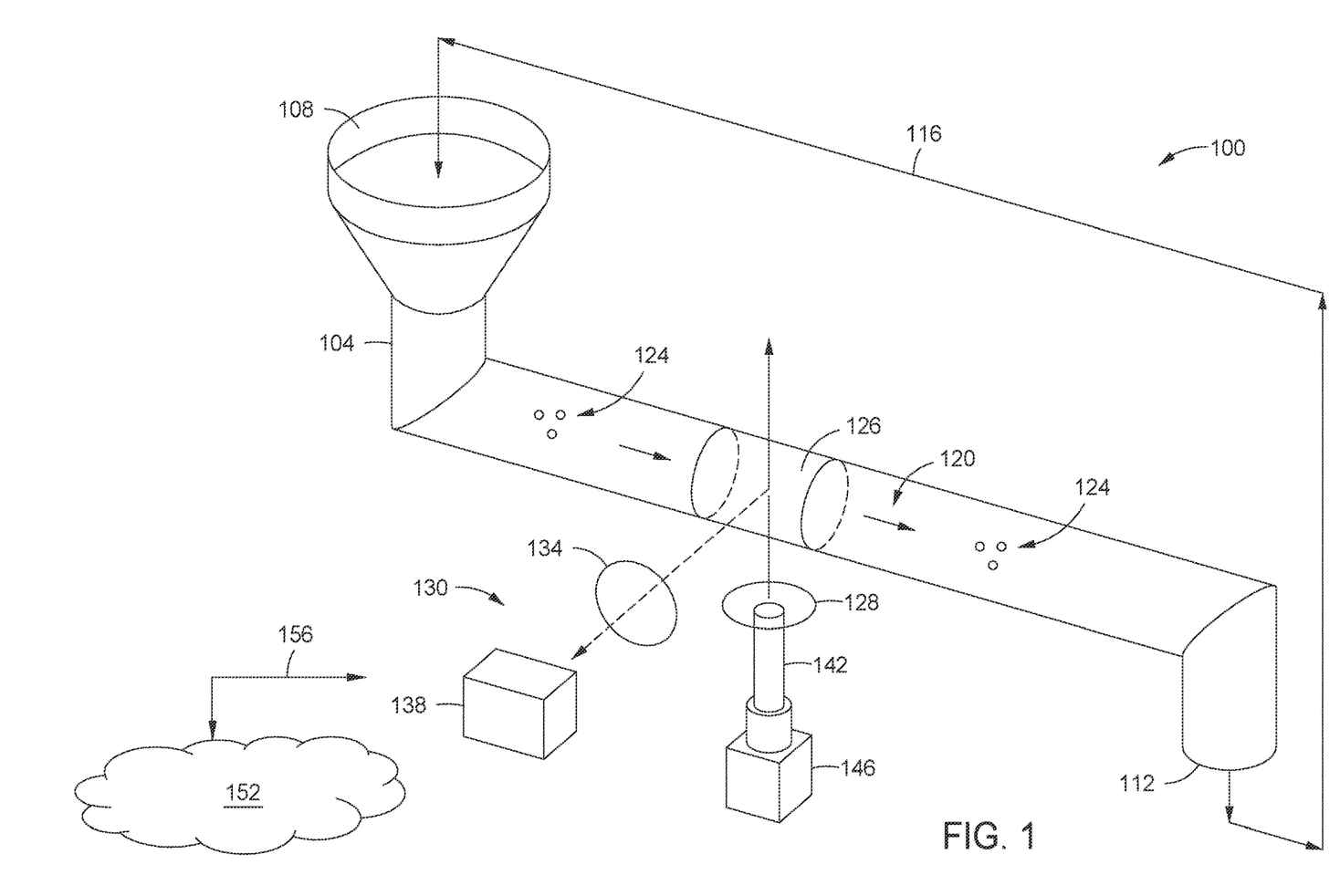
FIG. 1 is a schematic orthogonal view of a particle imaging system disposed within a pool.

FIG. 1 is a schematic orthogonal view of a particle imaging system 100 disposed within a pool 104. A fluid 120 flows through the pool 104. The fluid 120 may enter the pool 104 through an inlet 108. An outlet 112, fluidly coupled to the inlet 108, provides a pathway for the fluid 120 to exit the pool 104. The inlet 108 can be coupled to a source (not shown) of UPW. In some examples, the outlet 112 communicates with the inlet 108 via a return 116. The return 116 directs fluid 120 to the inlet 108, restoring fluid 120 that has exited the outlet 112 back to the pool 104. The fluid 120 may be water, $H_2O$. The water may be UPW treated to remove contaminants including organic and inorganic compounds, dissolved and particulate matter, and gases. The gases may be dissolved, volatile, non-volatile, reactive, inert, hydrophilic, and hydrophobic. However, it is understood that the UPW may be treated to remove contaminants not specifically recited herein.

A particle(s) 124 may be present in the fluid 120. The particle 124 may be residual materials that remain in the fluid 120 after a manufacturing process. For example, the particle 124 may remain in the pool 104 after the fluid 120 has been used to remove contaminants on a surface of a substrate. The particle 124 may be mineral deposits, microorganisms, and trace organic and nonorganic chemicals, including other contaminants. Depending upon manufacturing process, the particle 124 can be from a few micrometers (mm) to a few nanometers (nm).

A vessel 126 may be a portion or segment of the pool 104. The particles 124 of the fluid 120 passes through the vessel 126. The vessel 126 surrounds the fluid 120. The vessel 126 may be made of glass, quartz, plastic, or other substantially transparent material that enable light to pass therethrough. While the vessel 126 is shown as generally cylindrical, the shape is not limited to this geometry, and may be any geometry such that the fluid 120 is configured to flow therethrough.

The particle imaging system 100 includes an imaging device 130. An imaging lens 134 and a detector 138 are included in the imaging device 130. A laser source 146 is included in the particle imaging system 100. The laser source 146 emits a laser beam 142. A focusing lens 128 can be positioned between the laser source 146 and the vessel 126. The focusing lens 128 focuses or narrows a diameter of the laser beam 142 before the laser beam 142 enters the vessel 126. Alternatively, the focusing lens 128 can widen the diameter of the laser beam 142.

Figure 2:
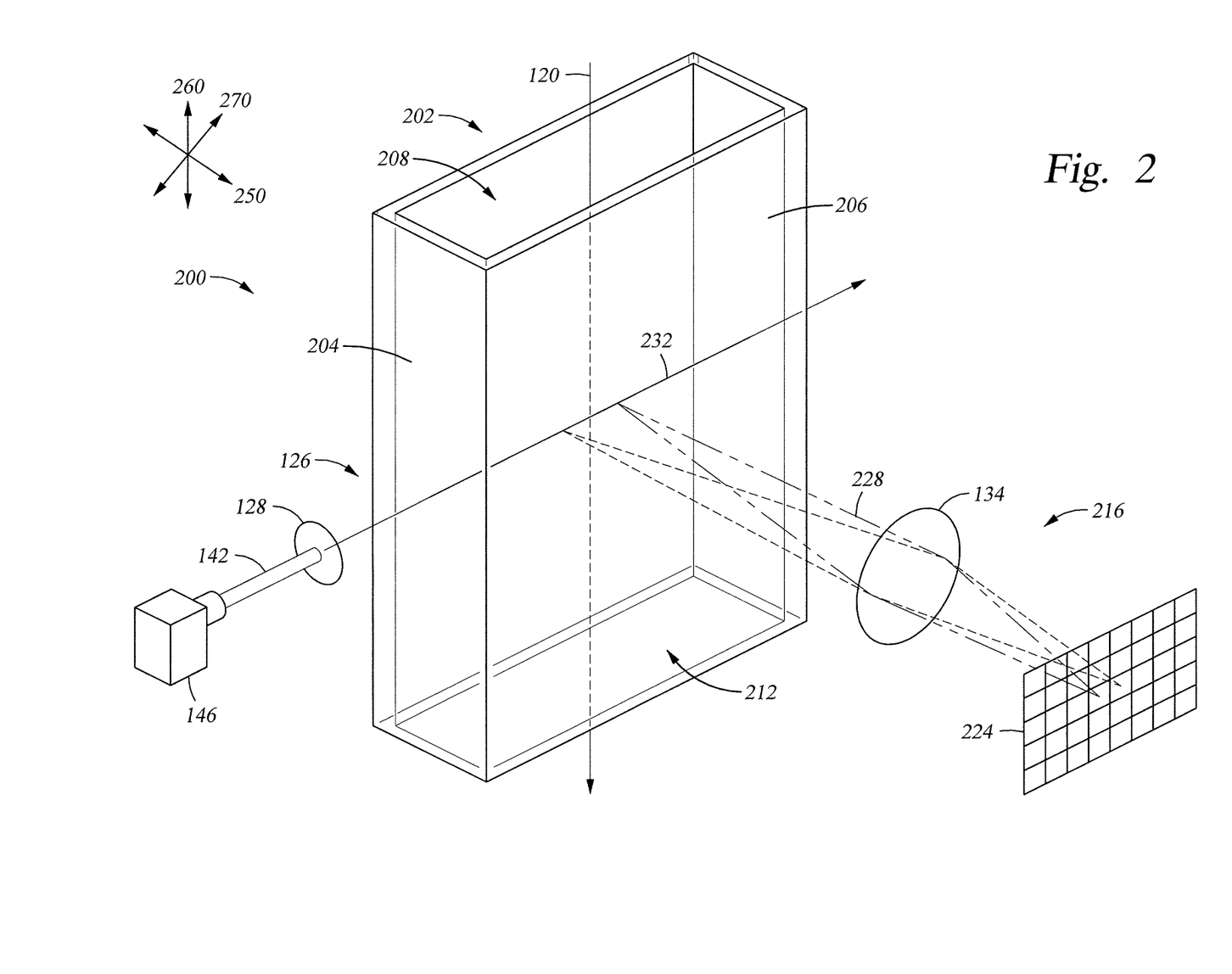
FIG. 2 is a schematic orthogonal view of an imaging system configured to capture images of particles passing through a vessel of FIG. 1.

FIG. 2 is a schematic orthogonal view of an imaging system 200 configured to capture images of a particle 124 passing through the vessel 126 of FIG. 1. The imaging system 200 includes an imaging device 216, the laser source 146, and a hollow prism 202. The hollow prism 202 is shown generally as a parallelogram, however it is understood that the hollow prism 202 is not limited to this geometry, and may be any geometry such that fluid 120 is configured to flow therethrough.

The hollow prism 202 has a first side 204. The hollow prism 202 has another first side 204 that is coplanar and substantially equal in dimension. A second side 206 is in contact with first side 204. The hollow prism 202 has another second side 206 positioned coplanar to and substantially equal to the second side 206. The second side 206 may be substantially perpendicular to the first side 204. The hollow prism 202 may be substantially in the shape of a hollow cuboid.

The hollow prism 202 has a top 208. The top 208 is substantially unobstructed and enables fluid 120 to enter the hollow prism 202. The top 208 of the hollow prism 202 is substantially coaxial with the bottom 212 of the hollow prism 202. Fluid 120 enters the top 208 of the hollow prism 202 in a y-direction 260. The top 208 can have the same cross-sectional area as the bottom 212. It is understood however, that the top 208 and the bottom 212 may have different cross-sectional areas. The fluid 120 exits the hollow prism 202 through a bottom 212 that is substantially unobstructed.

The imaging device 216 is disposed in proximity to the hollow prism 202. The imaging device 216 may be partially or fully submersed in the pool 104, shown in FIG. 1. Alternatively, the imaging device 216 may be positioned outside of the pool 104. The imaging lens 134 and a detecting array 224 are included in the imaging device 216.

The laser beam 142 is on an upstream side of the focusing lens 128. A focused beam 232 is formed on a downstream side of the focusing lens 128. The focused beam 232 is part of the laser beam 142 that has been narrowed by the focusing lens 128. Narrowing of the focused beam 232 reduces a cross-sectional area (A) of the laser beam 142. Alternatively, the focused beam 232 can be expanded. A cross-sectional area (A) of the focused beam 232 may be increased in a manner that corresponds to the cross-sectional area (A) of the laser beam 142.

The focused beam 232 passes through the first side 204 of the hollow prism 202. The focused beam 232 can be substantially orthogonal to the flow of fluid 120. As fluid 120 flows through the hollow prism 202, the focused beam 232 illuminates the fluid 120, as the fluid 120 passes through the vessel 126. Particles 124 travelling in the fluid 120 (shown in FIG. 1) are illuminated by the focused beam 232. Light from the focused beam 232 is scattered by the particles 124 that are disposed in the fluid 120. Scattered light of the focused beam 232 passes through the hollow prism 202. The scattered light may be photons that scatter from the particle 124. Collected light 228 is a portion of the scattered light of the focused beam 232. Collected light 228 includes the scattered light from the focused beam 232. The collected light 228 is the portion of the scattered light that has passed through the second side 206 of the hollow prism 202. Alternatively, the collected light 228 can pass through the first side 204 of the hollow prism 202.

Collected light 228 from the laser beam 142 is received by the imaging device 216 after passing through a second side 206 of the hollow prism 202. It is understood that the first side 204 and the second side 206 are relative terms. For illustrative purposes, the collected light 228 is shown passing through the second side 206. However, it is understood that the collected light 228 may take several paths out of the hollow prism 202. For example, the imaging device 216 can be configured so that collected light 228 is received after passing through the first side 204. The collected light 228 discussed herein includes light that is refracted, scattered, reflected from the surface of the particle 124, and background light. Collected light 228 may also include light emitted from the laser beam 142, as the laser beam 142 passes through the fluid 120 and/or hollow prism 202. Collected light 228 is stored with a corresponding value on an n×m pixel of the detecting array 224. The detecting array 224 is an n×m array, having n pixel rows and m pixel columns.

As fluid 120 flows through the hollow prism 202, the laser beam 142 is focused through the first side 204 of the hollow prism 202. The presence of the particle 124 in the fluid 120 will cause a certain amount of scattering of the focused beam 232 as collected light 228. The collected light 228 is collated by imaging lens 134 on the second side 206 of hollow prism 202. The collected light 228 thus collected is focused onto the detecting array 224. The scattering of light by the particle 124 in the Rayleigh regime can be formulated as that due to a dipole, whose maximum radiation value is given by the following expression 1:

$$I \approx I_o \left( \frac{\left(\frac{n}{n_o}\right)^2 - 1}{\left(\frac{n}{n_o}\right)^2 + 2} \right)^2 * \left( \frac{d^6}{\left(\frac{\lambda}{n_o}\right)^4} \right)$$

An illumination intensity is represented by $I_0$; n is a refractive index of the particle 124; $n_o$ is a refractive index of the fluid 120; λ is a wavelength of light in a vacuum. The wavelength λ may be any range between the x-ray to far-infrared range. A diameter of the particle 124 is represented by d. The illumination intensity $I_0$ is equal a power (P) of the laser beam 142 divided by the cross-sectional area (A) of laser beam 142, and I is the accumulated or actual intensity of the laser beam 142.

An area A is the cross-sectional area (A) of the laser beam 142. A=πD²/4, where D is the diameter of laser beam 142 at a point where the particle 124 intersects the laser beam 142. Alternatively, the D may be a diameter of the focused beam 232 at a point where the particle 124 intersects the focused beam 232. The illumination intensity $I_0$ is proportional to 1/D². On a downstream side of the focusing lens 128, the focused beam 232 has a cross-sectional diameter $D_1$. An interrogation volume of the fluid 120 increases as the cross-sectional diameter $D_1$ increases. The interrogation volume of the fluid is represented by $$l * \pi * \left(\frac{D_1}{2}\right)^2,$$

where l is a length of the laser beam 142 image captured by the imaging device 216. An overall sensitivity of the imaging device 216 is inversely proportional to the cross-sectional diameter $D_1$ of focused beam 232.

The appearance of the term (n/$n_o$) in expression 1 results in a reduction of the relative scattering of the particle 124 in fluid 120 compared with relative scattering of the particle 124 in atmospheric air. However, this reduction in scattering is compensated by the term (λ/$n_o$), representing refraction in liquid.

An amount of light collected can be a function of the numerical aperture (NA) of the imaging lens 134. The amount of light collated may also be a function of the integration time of the detecting array 224. The integration time of the detecting array 224 corresponds to the velocity of the particle(s) 124 passing through the fluid 120. A total detected energy per particle 124 is I(δt). The integration time δt is the time it takes for particle 124 to pass through the laser beam 142. Alternatively, the integration time δt can be the time it takes for particle 124 to pass through the focused beam 232. The integration time δt=D/v, where v is velocity of particle 124. As such, integration time is proportional to the diameter $D_1$ of focused beam 232.

As the NA increases, the amount of collected light 228 increases. By increasing the amount of collected light 228, a certain amount of background noise (i.e., radiation) is also collected by the detecting array 224. This background noise originates in collected light 228 due to the molecular level fluctuations in the fluid 120. Collected light 228 passing through the second side 206 of the hollow prism 202 can also contribute to the background noise. The background noise manifests as a "DC" signal in the output of the detecting array 224.

In detecting the particle(s) 124, a shot noise associated with the background noise is an important factor to consider. The imaging device 216 has the ability to substantially collect all the light within its NA. The dynamic range of the detecting array 224 should be high enough to be able to accommodate the background noise. Additionally the shot noise associated with the background light should be low enough for small particle(s) 124 to be detected.

The detecting array 224 is configured to substantially eliminate background noise associated with the collected light 228. As stated above, the detecting array 224 is an n×m array, having n pixel rows and m pixel columns. The detecting array 224 can include 1,000 or more rows n. The number of columns m can be up to 8,000. In some examples, the detecting array 224 can be a linear array, where the number of rows is equal to about 1. The detecting array 224, is a device such as a charge-coupled device (CCD), or complementary metal-oxide-semiconductor (CMOS) array, onto which falls the collected light 228 from an illuminated region (i.e., the illumination volume of the focused beam 232). In an example when the focusing lens 128 is not used, the illuminated region includes the illumination volume of the laser beam 142.

Alternative methods of performing this task include the use of a linear CMOS array, and a static mode CCD array. When the particle 124 passes the focused beam 232 within a field of view of the imaging lens 134, the collected light 228 from the particle 124 is imaged onto a corresponding position on the detecting array 224 (FIG. 2), as the particle 124 travels downward in a vertical direction (i.e., the y-direction 260). The y-direction 260 is perpendicular to both an x-direction 250 and a z-direction 270.

The detecting array 224 may be configured to perform time delay integration (TDI). An image of the particle 124 also moves along a column (m) of the detecting array 224. The image of the particle 124 moves in synchronicity with a position of the particle 124. Otherwise stated, the image of the particle 124 on a given n×m pixel corresponds to the vertical position of the particle 124 as it travels through the focused beam 232. A given n×m pixel of detecting array 224 generates a charge. The charge moves in synchrony with the movement of the particle 124 sequentially along a column (m column) of detecting array 224. The charge generated in each pixel along the row (n) accumulates successively through each corresponding column (m), as the particle 124 moves in the vertical direction. In addition, as the image of the particle 124 moves in the vertical direction, the charge generated in each n×m pixel along the row (n) accumulates successively through each corresponding column (m). Thus, an accumulated charge at the end of each column m corresponds to the collected light 228 throughout a position of the particle 124 as it passes the focused beam 232. Advantageously, the illumination intensity $I_0$, stored as a signal in detecting array 224, increases in a traveling direction of the particle 124.

The TDI operation accumulates charge throughout the travel time of the particle 124 in the focused beam 232. The TDI operation increases the total amount of collected scattered photons stored as signals in the column (m) of the detecting array 224. Narrowing a field of view of the imaging device 216 reduces the background noise that is stored onto a given n×m pixel. Advantageously, the TDI operation provides averaging of any spatial variation of the background noise that is imaged onto a given column (m) of the detecting array 224. In this manner, sensitivity of the imaging device 216 is enhanced.

In some examples, the plurality of columns (m) of the detecting array 224 may be several thousand. Accordingly, imaging device 216 is enabled to detect the simultaneous passage of a plurality of particle(s) 124. By acquiring data on several particles 124 simultaneously, the imaging device 216 is configured to reduce miscounting of the particle(s) 124. Miscounting of the particles can be the result of a coincidence of arrival into the illuminated region. For example, the illuminated region can be the illumination volume of the focused beam 232.

In particular, a desired signal from the collected light 228 accumulated from the particle 124 increases directly with the strength of the laser beam 142. Correspondingly, the background signal also increases directly with the strength of the laser beam 142. However, since the shot noise is proportional to the square root of the background signal, the signal to noise ratio increases with additional light. Accordingly, a sensitivity of the imaging device 216 is also increased. Focusing of the laser beam 124 has a similar effect. The sensitivity of the imaging device 216 improves linearly (i.e., proportional to 1/D) with the reduction in diameter D of the laser beam 142.

The imaging device 216 can be configured to enhance sensitivity and maintain a counting efficiency of the particle 124. The sensitivity of particle imaging system 100 also corresponds to the NA of the imaging device 216. However, the larger the NA, the shorter is the depth of focus of the collected light 228. Widening the laser beam 142 diameter D will result in the narrowing of the focused beam 232. The integration time δt of the particle(s) 124 for a given flow rate of the fluid 120 is correspondingly reduced. Furthermore, the reduction in the diameter D of the focused beam 232 corresponds to a smaller interrogation volume of the fluid 120 (e.g., the illumination volume of the focused beam 232).

Figure 3:
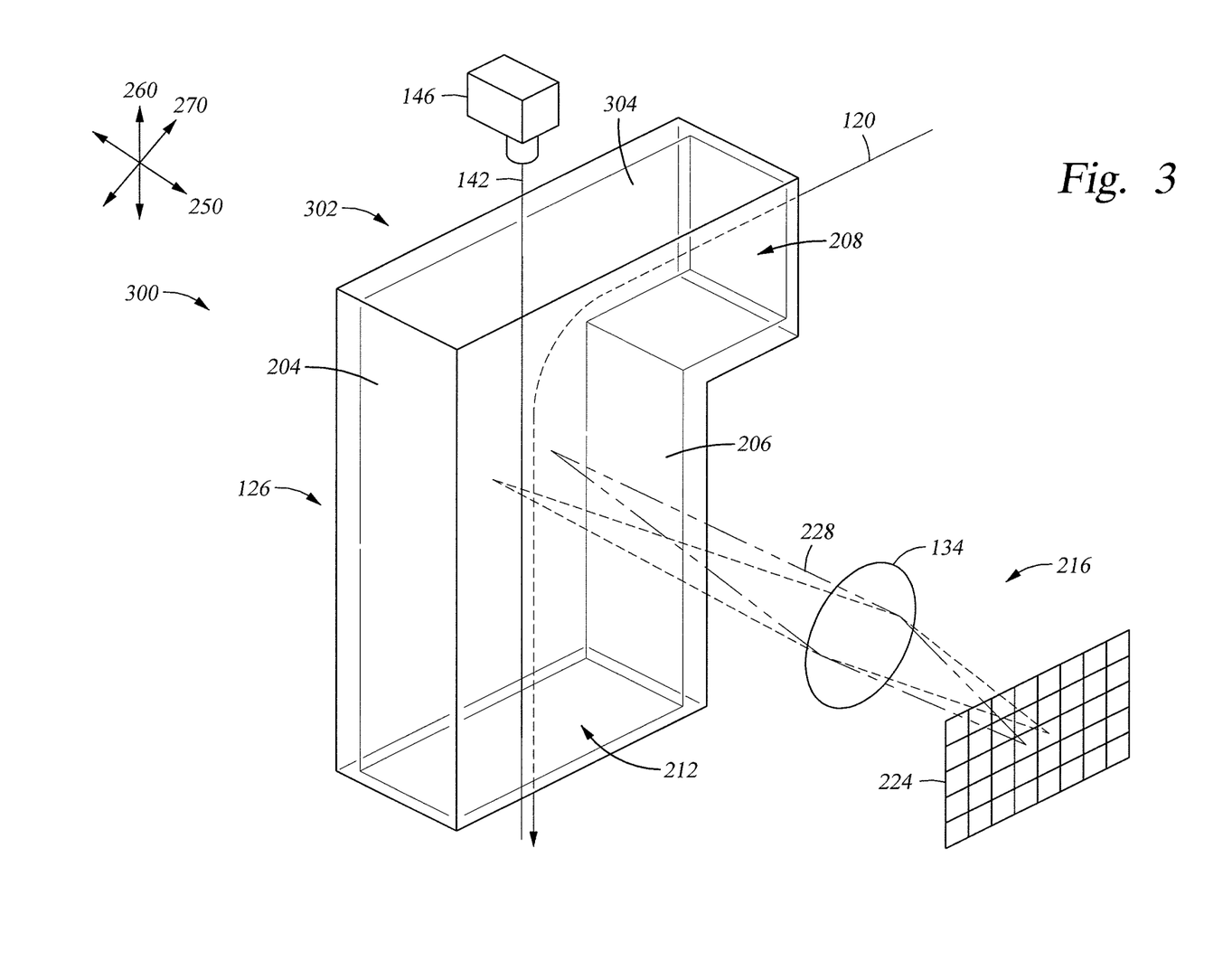
FIG. 3 is a schematic orthogonal view of another imaging system configured to capture images of particles passing through the vessel of FIG. 1.

FIG. 3 is a schematic orthogonal view of another imaging system 300 configured to capture particles 124 passing through the vessel of FIG. 1. The imaging system 300 includes the imaging device 216, the laser source 146, and a hollow prism 302. As mentioned above, the hollow prism 302 is shown generally as a parallelogram, however it is understood that the hollow prism 302 is not limited to this geometry, and may be any geometry such that fluid 120 is configured to flow therethrough.

The hollow prism 302 includes the first side(s) 204, second side(s) 206, and third side(s) 304. The hollow prism 302 has another third side 304 that is opposite and coplanar to the third side 304 depicted in FIG. 3. Collectively the sides may be referred to as third sides 304. The top 208 of the hollow prism 302 is not coaxial with the bottom 212 of the hollow prism 302. In an example, the cross-section of the top 208 is within a plane that is substantially perpendicular to another plane in which the cross-section of the bottom 212 is disposed. Fluid 120 enters the hollow prism 302 in the z-direction 270 through the top 208. The bottom 212 provides an exit for the fluid 120 to escape the hollow prism 302 in the y-direction 260.

The laser source 146 is positioned substantially orthogonal to the third side 304. The laser beam 142, emitted by the laser source 146, enters the hollow prism 302 through the third side 304. The laser beam 142 may be substantially parallel to the flow of the fluid 120 in the hollow prism 302.

The imaging lens 134 of the imaging device 216 is positioned substantially orthogonal to the second side 206 of the hollow prism 302. Collected light 228 passes through the imaging lens 134. Collected light 228 is stored with a corresponding value on an n×m pixel of the detecting array 224.

Figure 4:
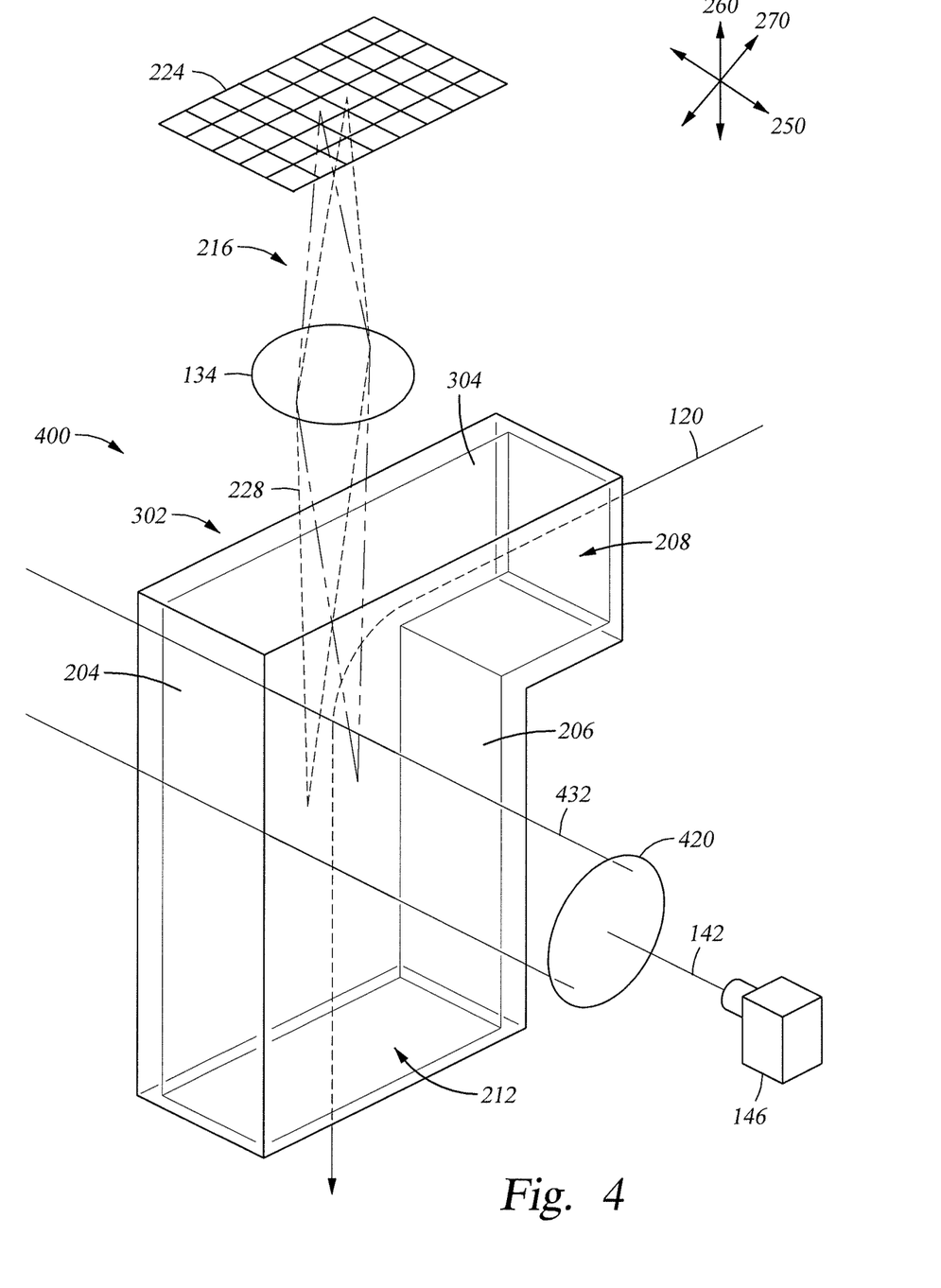
FIG. 4 is a schematic orthogonal view of an exemplary imaging system configured to capture images of particles passing through the vessel of FIG. 1.

FIG. 4 is a schematic orthogonal view of an exemplary imaging system 400 configured to capture particles 124 passing through the vessel of FIG. 1. The imaging system 400 includes the imaging device 216, the laser source 146, and the hollow prism 302. Fluid 120 flows through the top 208 of the hollow prism 302 and exits through the bottom 212 of the hollow prism 302.

The imaging device 216 is oriented along the y-direction 260. The detecting array 224 may be substantially coplanar to the third side 304. Collected light 228 from hollow prism 302 travels along the y-direction 260 toward the imaging lens 134. The collected light 228 is stored with a corresponding value on the n×m pixel of the detecting array 224.

The laser source 146 is substantially perpendicular to the second side 206 of the hollow prism 302. A focusing lens 420 is disposed between the hollow prism 302 and the laser source 146. The focusing lens 420 focuses the laser beam 142. On a downstream side of the focusing lens 420, a focused beam 432 has a cross-sectional diameter $D_2$. As the cross-sectional diameter $D_2$ increases, the interrogation volume of the fluid 120 increases. The cross-sectional diameter $D_1$ of the focused beam 232 is less than the cross-sectional diameter $D_2$ of the focused beam 432. An overall sensitivity of the imaging device 216 is inversely proportional to the cross-sectional diameter $D_2$ of focused beam 432.

Figure 5:
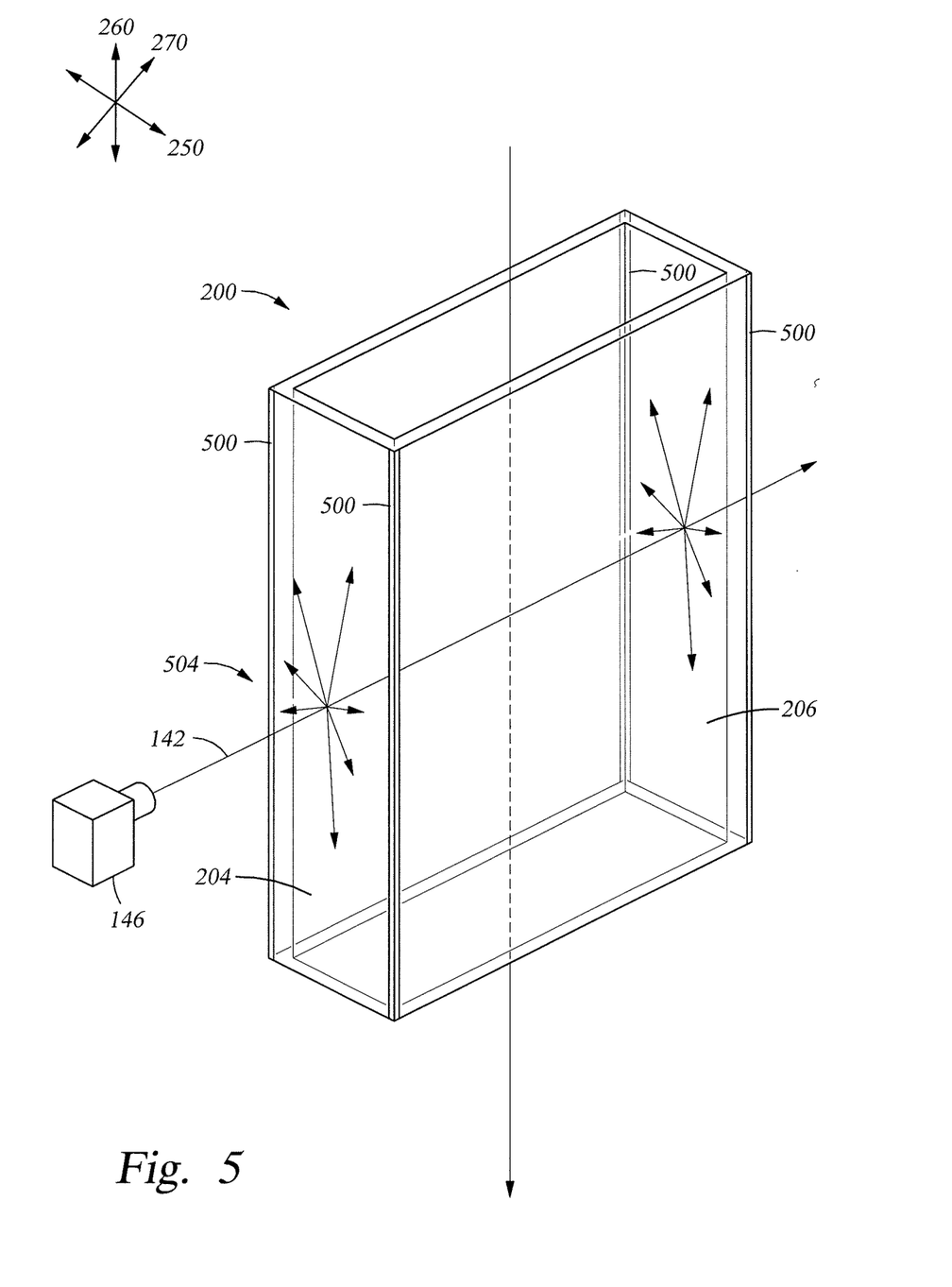
FIG. 5 is a schematic orthogonal view of obscured edges of a hollow prism depicted in FIG. 2-4.

FIG. 5 is a schematic orthogonal view of obscured edges 500 of the hollow prism 202 depicted in FIG. 2. Herein, it is understood that obscured edges 500 may also be applied to hollow prism 302, illustrated in FIGS. 3-4. The hollow prism 202 has first side(s) 204 and second side(s) 206. The laser beam 142 emitted from the laser source 146 enters the hollow prism 202 through a first side 204.

The laser beam 142 may be refracted upon contact with the first side 204 of the hollow prism 202. Refraction of the laser beam 142 causes scattered light 504. The scattered light 504 can travel radially on a surface of the first side 204. The scattered light 504 may also travel through a thickness of the first side 204. Upon entering the hollow prism 202, the scattered light 504 contributes to the background signal detected by the imaging device 216 (shown in FIG. 2-4).

Obscured edges 500 are provided on a surface of the hollow prism 202. Each obscured edge 500 absorbs scattered light 504. The obscured edge 500 may be coated with paint, an adhesive, a polymer strip, particulate granules, or other means by which light (i.e., photons) are absorbed into the obscured edge 500. The obscured edge(s) 500 absorb refracted light, reducing background signal, and shot noise thereof, in the collected light 228 (shown in FIG. 2)

Figure 6:
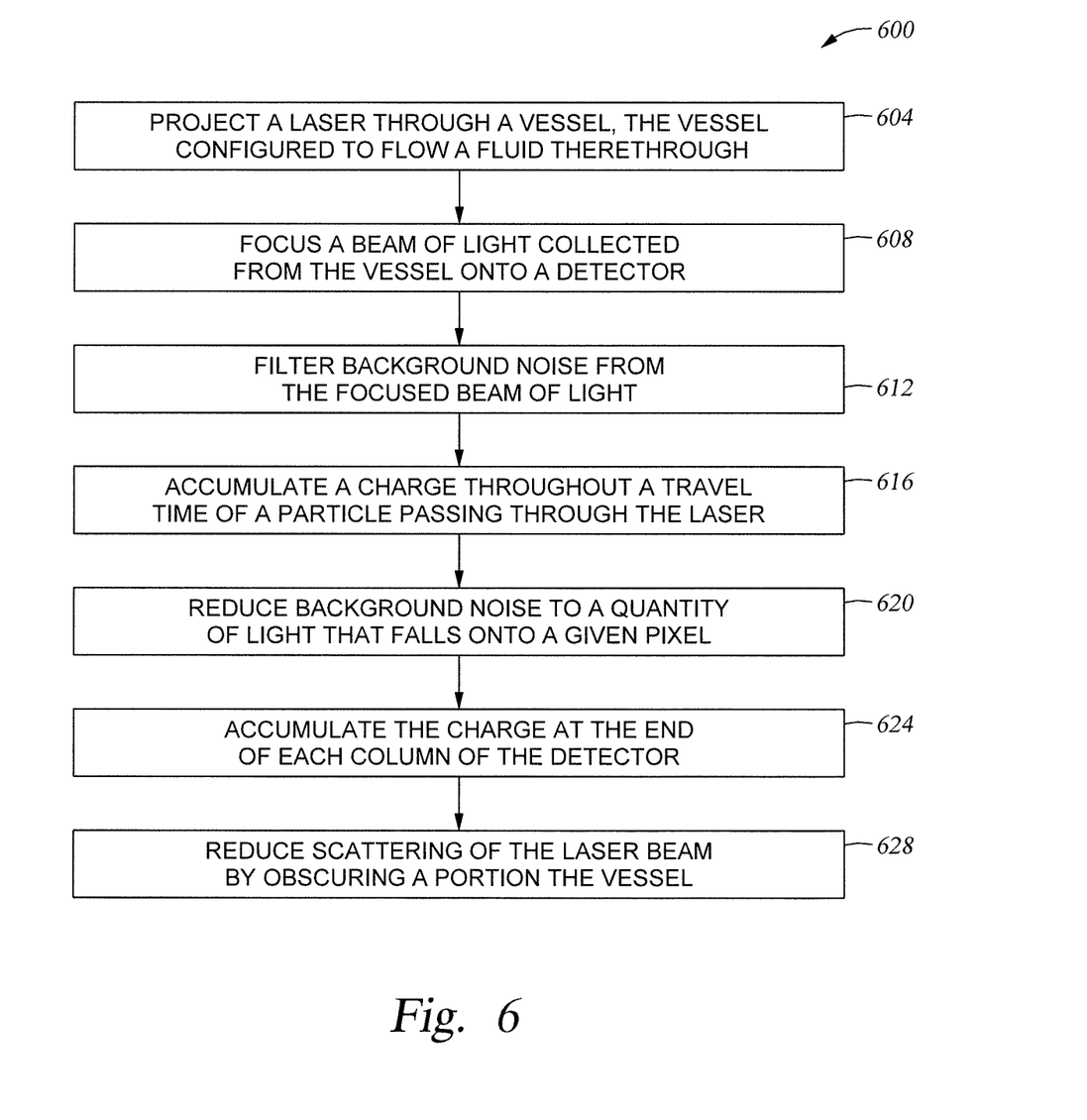
FIG. 6 is a flow diagram of a method of measuring light reflected within the particle imaging system of FIG. 1.

FIG. 6 is a flow diagram of a method 600 of measuring light reflected within the particle imaging system of FIG. 1. At block 604, a laser beam 142 is projected through the vessel 126. The vessel 126 may be any one of the hollow prisms in FIGS. 2-5. The particles 124 of the fluid 120 passes through the vessel 126. At block 608 a focused beam 232 of light is collated as collected light 228 from the vessel 126. The collected light 228 is stored as a signal on a detecting array 224. The illumination intensity $I_0$, stored as a signal on the n×m pixel of the detecting array 224. Background noise from the focused beam 232 of light is filtered within the imaging device 216 at block 612. The method 600 continues at block 616 where a charge is accumulated throughout a travel time of a particle passing through the laser beam 142. The background signal, and shot noise thereof, is reduced to a quantity of light that falls onto a given pixel of the n×m detecting array 224 at block 620. At block 624, the charge is accumulated at the end of each column (m) of the detecting array 224, having n×m pixels. Scattering of the laser beam 142 is reduced by obscuring a portion of the vessel 126 at block 628.

Figure 7:
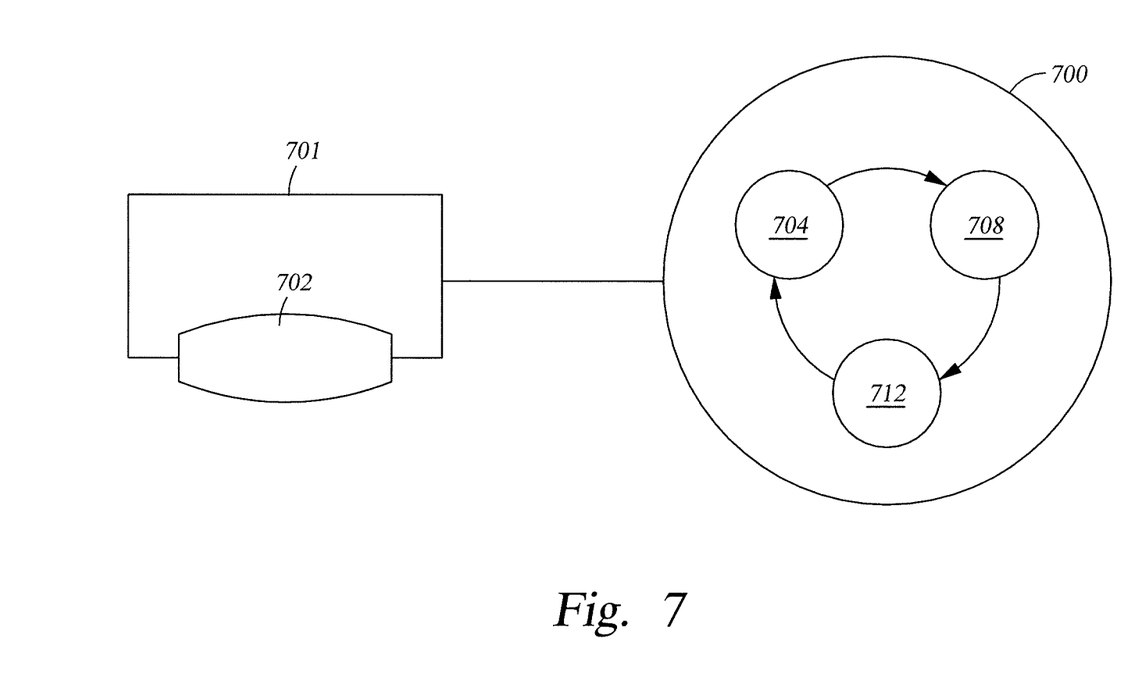
FIG. 7 is a plan view of the imaging device used to measure light reflected from the particle imaging system of FIG. 1.

FIG. 7 is a plan view of the imaging device 216 used to measure light scattered from the particle imaging system of FIG. 1. The imaging device 216 in some examples is a camera 701 that is coupled to a controller 700. The controller 700 includes a processor 704, a memory 708, and support circuits 712 that are coupled to one another. The controller 700 may be on-board the camera 701, or in an alternative example, the controller 700 may be on-board a remote device (not shown) that receives images from the camera 701. The camera 701 has at least one lens 702 that is configured to capture images of the particle imaging system 100, disclosed herein.

The imaging device 216 includes an input control unit, such as power supplies, clocks, cache, input/output (I/O) circuits, coupled to the various components of the imaging device 216 to facilitate control thereof. Optionally, imaging device 216 can include a display unit (not shown). The processor 704 may be one of any form of general purpose microprocessor, or a general purpose central processing unit (CPU), each of which can be used in an industrial setting, such as a programmable logic controller (PLC).

The memory 708 is non-transitory and may be one or more of readily available memory such as random access memory (RAM), read only memory (ROM), or any other form of digital storage, local or remote. The memory 708 contains instructions, that when executed by the processor 704, facilitates the operation of the imaging device 216. The instructions in the memory 708 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

In one example, the disclosure may be implemented as the program product stored on a computer-readable storage media (e.g. 708) for use with a computer system (not shown). The program(s) of the program product define functions of the disclosure, described herein. The programs/instructions include algorithms that are configured to process light collected from particle imaging systems shown in FIGS. 1-5.

Herein, an apparatus and method are disclosed for detecting particles in a fluid. While the foregoing is directed to specific examples, other examples may be devised without departing from the basic scope thereof, and the scope thereof is determined by the claims that follow.

What we claim is:

1. A system for imaging a particle, comprising
an imaging device comprising:
a lens;
a detector;
a laser source configured to emit a laser beam having a circle cross-section, wherein the detector is configured to accumulate an intensity of an accumulated light that passes through the lens, the accumulated light being scattered by the particle, wherein the laser beam is configured to form an interrogation volume, the interrogation volume defined by the circle cross-section and a length of the laser beam captured by the imaging device, the particle passing through the interrogation volume of the laser beam over a given period.

2. The system for imaging a particle according to claim 1, further comprising:
a hollow vessel, wherein the laser beam is configured to pass through the interrogation volume disposed within the hollow vessel.

3. The system for imaging a particle according to claim 2, further comprising:
a pool configured to store a fluid, wherein the hollow vessel coupled to the pool, wherein at least a portion of the fluid passes through the hollow vessel at a given velocity.

4. The system for imaging a particle according to claim 3, wherein the hollow vessel comprises a first side orthogonal to a second side, the laser beam further configured to pass parallel to the first side, and the second side is substantially perpendicular to the laser beam.

5. The system for imaging a particle according to claim 1, wherein an intensity of light that passes through the lens is accumulated in the imaging device by a time delay integration of the intensity.

6. The system for imaging a particle according to claim 1, further comprising:
a pool configured to store a fluid; and
a hollow vessel coupled to the pool, wherein at least a portion of the fluid passes through hollow vessel at a given velocity, the laser beam enters the hollow vessel at a position that is substantially orthogonal to a flow of the fluid, the interrogation volume comprising a portion of the fluid.

7. The system for imaging a particle according to claim 1, further comprising:
a pool configured to store a fluid; and
a hollow vessel coupled to the pool, wherein at least a portion of the fluid passes through hollow vessel at a given velocity, the laser beam enters the hollow vessel at a position that is substantially parallel to a flow of the fluid.

8. A light intensity measuring system, comprising:
an imaging device comprising:
at least one lens;
an array detector, the array detector having n rows and m columns;
a laser source configured to emit a laser beam having a circle cross-section, the array detector configured to accumulate an intensity of an accumulated light that passes through the lens, the accumulated light scattered by a particle, wherein laser beam is configured to form an interrogation volume, the interrogation volume defined by the circle cross-section and a length of the laser beam captured by the imaging device, the particle passing through the interrogation volume of the laser beam over a given period; and a vessel proximate the laser source configured to flow fluid therein, the laser beam configured to pass through the vessel, the interrogation volume disposed in the vessel and comprising a portion of the fluid.

9. The light intensity measuring system according to claim 8, wherein the laser beam is configured to pass through the vessel.

10. The light intensity measuring system according to claim 9, further comprising:

a pool configured to store the fluid, wherein the vessel is coupled to the pool, wherein at least a portion of the fluid passes through the vessel at a given velocity.

11. The light intensity measuring system according to claim 10, wherein the vessel comprises a first side orthogonal to a second side, the laser beam further configured to pass parallel to the first side, and the second side is substantially perpendicular to the laser beam.

12. The light intensity measuring system according to claim 8, wherein an intensity of light that passes through the lens is accumulated in the imaging device by a time delay integration of the intensity.

13. The light intensity measuring system according to claim 8, further comprising:

a pool configured to store a fluid, wherein at least a portion of the fluid passes through the vessel at a given velocity, the laser beam enters the vessel at a position that is substantially orthogonal to a flow of the fluid.

14. The light intensity measuring system according to claim 8, further comprising:

a pool configured to store a fluid, wherein at least a portion of the fluid passes through the vessel at a given velocity, the laser beam enters the vessel at a position that is substantially parallel to a flow of the fluid.

15. A method of measuring light intensity, comprising:

flowing a fluid through a hollow vessel, the fluid having at least one particle;

emitting a laser beam having a circle cross-section through the hollow vessel onto the at least one particle;

forming an interrogation volume with the laser beam within the hollow vessel, the interrogation volume defined by the circle cross-section and a length of the laser beam; and accumulating an intensity of light scattered by passing the particle the through interrogation volume over a given period, wherein the intensity is accumulated parallel to the length of the interrogation volume or orthogonal to the length of the interrogation volume, and the intensity corresponds to a refractive index of the particle.

16. The method of measuring light intensity according to claim 15, further comprising:

coupling the hollow vessel to a pool, wherein at least a portion of the fluid passes through vessel at a given velocity and mass flow rate.

17. The method of measuring light intensity according to claim 15, wherein the hollow vessel comprises a first side orthogonal to a second side, the laser beam further configured to pass parallel to the first side, and the second side is substantially perpendicular to the laser beam.

18. The method of measuring light intensity according to claim 15, wherein accumulating an intensity of light comprises accumulating light that passes through a lens of an imaging device by a time delay integration of the intensity of light.

19. The method of measuring light intensity according to claim 15, further comprising:

coupling the hollow vessel to a pool, wherein at least a portion of the fluid passes through hollow vessel at a given velocity, the laser beam enters the hollow vessel at a position that is substantially orthogonal to a flow of the fluid.

20. The method of measuring light intensity according to claim 15, further comprising:

coupling the hollow vessel to a pool, wherein at least a portion of the fluid passes through hollow vessel at a given velocity, the laser beam enters the hollow vessel at a position that is substantially parallel to a flow of the fluid.

* * * * *